United States Patent [19]

Miyata et al.

[11] Patent Number: 4,738,497

[45] Date of Patent: Apr. 19, 1988

[54] ANTIREFLECTION FILM

[75] Inventors: Takeo Miyata; Takuhiro Ono, both of Zama; Takashi Iwabuchi, Sagamihara; Masaru Ikedo, Ikoma; Masafumi Watari, Kadoma, all of Japan

[73] Assignee: Matsushita Electric Industrial Co., Ltd., Osaka, Japan

[21] Appl. No.: 783,090

[22] Filed: Oct. 2, 1985

[30] Foreign Application Priority Data

Oct. 5, 1984 [JP] Japan .................................. 59-209107
Nov. 14, 1984 [JP] Japan .................................. 59-239842

[51] Int. Cl.$^4$ ................................................ G02B 5/28
[52] U.S. Cl. ...................................... 350/1.6; 350/166
[58] Field of Search ........................... 35/1.6, 1.7, 166

[56] References Cited

PUBLICATIONS

Optical Engineering, vol. 18, No. 6, Nov./Dec. 1979, pp. 586–590, Bellingham, U.S.; W. T. Boord et al.; "Low Absorption TlI/KCl/TlI Antireflection Coatings for KCl Surfaces", Abstract.
J.E.E. Journal of Electronic Engineering, vol. 21, No. 212, Aug. 1984, pp. 30–34, Tokyo, JP; H. Ishiwatari: "Developing a $CO_2$ Laser for Precise Surgical Applications".

Primary Examiner—Bruce Y. Arnold
Attorney, Agent, or Firm—Stevens, Davis, Miller & Mosher

[57] ABSTRACT

An antireflection film composed of a layer of arsenic triselenide having an optical thickness in the range between 2.518 and 2.783 $\mu$m, a layer of potassium chloride having an optical thickness in the range between 1.151 and 1.272 $\mu$m and a layer of arsenic triselenide having an optical thickness in the range between 0.577 and 0.749 $\mu$m which are successively formed on a member of infrared radiation transmitting material formed of a mixture of thalium iodide and thalium bromide. The member provided with the three-layer antireflection film is used in an atmosphere of protective gas, such as dry air or dry $N_2$ gas.

1 Claim, 8 Drawing Sheets

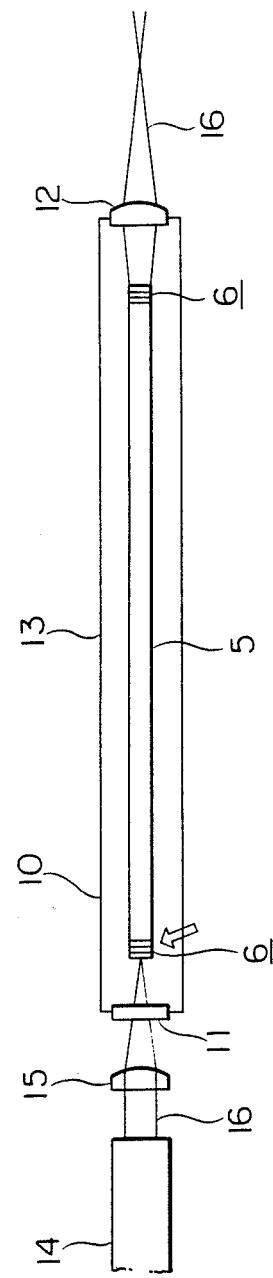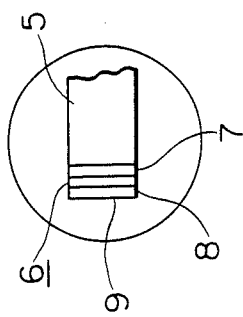
FIG. 5
FIG. 6

ANTIREFLECTION FILM

FIELD OF THE INVENTION

This invention relates to an antireflection film suitably used with KRS-5 which is one of materials used for optics of infrared optical instruments, such as windows, lenses, optical fibers, and which is mixed crystal of thalium iodide (TlI) and thalium bromide (TlBr), and also relates to an atmosphere in which such an antireflection film works.

Materials which are mixed crystals of thalium iodide and thalium bromide, among which KRS-5 is typical, have attraction for use as infrared radiation transmission materials for fibers that are suitably used as beam guides for carbon dioxide laser scalpels. KRS-5 which is transparent to a carbon dioxide laser having a wavelength of 10.6 μm can be formed by extrusion molding into flexible fibers having a diameter of substantially 0.5 mm. Although KRS-5 offers these advantages, it has a high refractive index of about 2.37 at a wavelength of 10.6 μm, resulting in a great loss in reflection which is about 28% at input and output ends when a fiber made of this material is used as a beam guide. Thus, the development of an antireflection film which can avoid a great reflection loss has been desired.

In view of the fact that the antireflection film coated on both end faces of the optical fiber introduces therethrough a carbon dioxide laser beam irradiated thereon, it is required that the antireflection film can well withstand a laser beam having a higher power in comparison with antireflection films coated on a window and lens used for ordinary infrared irradiations. More specifically, a laser beam is led to be incident on one end face of an optical fiber after being converged to a micro spot, with a result that the power density of the laser beam on the surface is substantially one hundred times as high as that of ordinary optics for handling a laser beam. For example, when a laser beam having an input power of 50 W is used, the power density at both end faces of the optical fiber rises to a level above 50 KW/cm$^2$. Besides, for practical purposes, an antireflection film is required to endure for long-time operation (more than 300 hours) under the aforesaid condition of laser beam irradiation.

In order to satisfy such severe specific requirements it is required to develop on one hand, an antireflective film which can withstand high power density laser beam irradiations and to prolong, and on the other hand, the operating life of such an antireflection film.

Development of an antireflection film which has a low laser absorption, that is, a low heat generation, greatly contributes to improved laser-resistant properties.

To this end, applicants have developed an antireflection film which is composed of three layers, As$_2$Se$_3$, PbF$_2$ and As$_2$Se$_3$.

It has been found that an antireflection film composed of the three layers As$_2$Se$_3$, PbF$_2$ and As$_2$Se$_3$ coated on both faces of a disc made of KRS-5 and having a diameter of 25 mm and a thickness of 3 mm, and on both end faces of a fiber also made of KRS-5 and having a diameter of 0.5 mm and a length of about 100 mm causes no damage even though it was irradiated with a carbon dioxide laser beam having an input power of 85 W and a power density of about 150 KW/cm$^2$ for one minute.

Thereafter, when the antireflection film of the aforesaid construction was subjected to a continuous irradiation of a laser beam having an input power of about 35 W and a power density of about 36 KW/cm$^2$, it was found that damage was caused thereto after about 30 hours of continuous irradiation. Samples used in the experiments were prepared such that the above-mentioned antireflection film is coated by vacuum deposition on both faces of disc a made of KRS-5 and having a diameter of 25 mm and a thickness of 3 mm. Further the experiments were conducted in air.

It may be said that the operating life of 30 hours is relatively long in comparison with prior art films. However, a further prolongation of the operating life is desired for practical purposes.

Experiments in which the antireflection films of the aforesaid construction coated on both end faces of windows and fibers made of KRS-5 are subjected in air to continuous irradiation of a carbon dioxide laser beam having an input power of 35 W and a power density of 36 KW/cm$^2$, show that, although no damage takes place in the antireflection film, for about 30 hours no longer operating life of the antireflection film can be expected.

SUMMARY OF THE INVENTION

The object of the present invention is to provide an antireflection film which has a higher damage threshold level than that of a conventional antireflection film and as well to provide an atmosphere in which the antireflection film can be optimally used, in order that the operating time of the antireflection film against a carbon dioxide laser irradiation can be prolonged and loads applied to a power source can be reduced, to thereby reduce the cost of the laser system as a whole.

To accomplish the aforesaid object, the invention provides an antireflection film of a compound construction composed of three layers, As$_2$Se$_3$, KCl and As$_2$Se$_3$, and an atmosphere of protective gas, such as dry air or dry N$_2$ gas under which the antireflection film works.

The antireflection film of the aforesaid construction withstands well against irradiation of a carbon dioxide laser beam, and under an atmosphere of protective gas, such as dry air or dry N$_2$ gas, the duration of operation of the antireflection film can be prolonged.

The construction of the three-layer antireflection film having a high damage threshold level against laser irradiation, according to the present invention, will be at first explained. The antireflection film is prepared such that arsenic triselenide (As$_2$Se$_3$) glass of a high refractive index material (n=2.8) which is low-absorptive but high-adhesive in its amorphous state is vacuum-deposited on the surface of a KRS-5, then potassium chloride (KCl) of a low refractive index material (n=1.45) which is lower absorptive than PbF$_2$ is vacuum-deposited thereon, and further As$_2$Se$_3$ which has an effect to replenish a weakness in the water-resistant property of KCl and in which little pin-holes are produced upon the vacuum deposition, is vacuum-deposited.

Thus the antireflection film according to the invention is low absorptive and has therefore a high damage threshold level against laser irradiation, so that it offers a characteristic such that its operating life against irradiation of a carbon dioxide laser beam can be greatly prolonged.

BRIEF DESCRIPTION OF THE DRAWINGS

FIG. 5 is a illustrating an optical cable in which fibers formed of KRS-5 are packed;

FIG. 6 is a sectional view, in an enlarged scale of the essential part of the optical cable shown in FIG. 5;

DESCRIPTION OF THE PREFERRED EMBODIMENT

Figure 1:
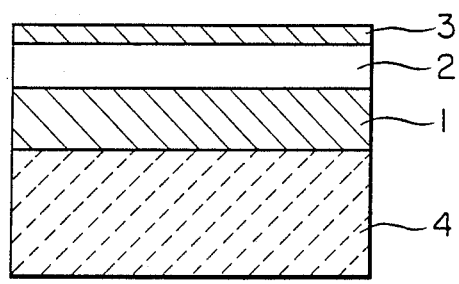
FIG. 1 is a sectional view of an antireflection film suitable for use with KRS-5 in one embodiment form of the invention.

FIG. 1 is a sectional view of the antireflection film in one embodiment form of this invention. The numeral 4 designates a base formed of KRS-5 and having an index of refraction of 2.37. The base 4 has a surface which is optically polished with an ultra-high degree of accuracy. The numerals 1, 2 and 3 designate respectively, a layer of $As_2Se_3$ having an index of refraction $n_1$ of 2.8 and an optical thickness $n_1d_1$ of 2.650 μm, a layer of KCl having an index of refraction $n_2$ of 1.45 and an optical thickness $n_2d_2$ of 1.211 μm and a layer of $As_2Se_3$ having an index of refraction $n_3$ ($=n_1$) of 2.8 and an optical thickness $n_3d_3$ of 0.713 μm. The optical thicknesses of the three-layer antireflection film described hereinabove are decided such that they satisfy the equation of Mouchart with regard to the three-layer antireflection film (Applied Optics, Vol. 16, No. 10, p. 2722).

With respect to the set values of thickness of the film as mentioned above, the reflectivity (R) for a wavelength of 10.6 μm was calculated by independently changing the values with a variation of 5%. The results are as follows:

When only $n_1d_1$ is changed:

2.518 μm < $n_1d_1$ < 2.783 μm   R < 0.02%

When only $n_2d_2$ is changed:

1.151 μm < $n_2d_2$ < 1.272 μm   R < 0.1%

When only $n_3d_3$ is changed:

0.677 μm < $n_3d_3$ < 0.749 μm   R < 0.079

When the thicknesses of all the layers are simultaneously increased by 5% from the set values;

$$\left. \begin{array}{l} n_1d_1 = 2.783 \text{ μm} \\ n_2d_2 = 1.272 \text{ μm} \\ n_3d_3 = 0.749 \text{ μm} \end{array} \right\} R \sim 0.4\%$$

When the thicknesses of all the layers are simultaneously decreased by 5% below the set values:

$$\left. \begin{array}{l} n_1d_1 = 2.518 \text{ μm} \\ n_2d_2 = 1.151 \text{ μm} \\ n_3d_3 = 0.677 \text{ μm} \end{array} \right\} R \sim 0.4\%$$

Thus, the total reflectivity of the base formed of KRS-5 provided with the antireflection film at either end face thereof takes a value of about 0.8%. This value exhibits a limit of a practically allowable range so that the thicknesses of the three layer antireflection film according to the invention are set within the following ranges:

2.518 μm < $n_1d_1$ < 2.783 μm 1.151 μm < $n_2d_2$ < 1.272 μm 0.677 μm < $n_3d_3$ < 0.749 μm

In the antireflection film according to the invention, a disc of single crystal having a diameter of 25 mm and a thickness of 3 mm and polished beforehand at opposite side surfaces and a fiber of poly crystal having a diameter of 0.5 mm and a length of about 100 mm and polished beforehand at opposite end faces are used as bases formed of KRS-5. An $As_2Se_3$ vacuum depositing crucible used in such a type that it is formed of molybdenum (Mo) and is provided with a cover in which an opening for preventing bumping is formed. A vacuum vapor depositing operation was performed at a working pressure of $1.5 \times 10^{-6}$ Torr and a depositing speed of 12 Å/sec while keeping the base at a temperature of 100° C. For vapor deposition of KCl, a crucible of a box shape formed of Mo was used and the vapor deposition was performed at a working pressure of $1.5 \times 10^{-6}$ Torr and a deposition speed of 12 Å/sec while keeping the substrate at a temperature of 110° C. The deposition speed was controlled by means of a quartz oscillator, and the thickness of each layer of the antireflection film was controlled by means of a transmission type optical film thickness control unit using infrared rays of a wavelength of 1.505.

Figure 2:
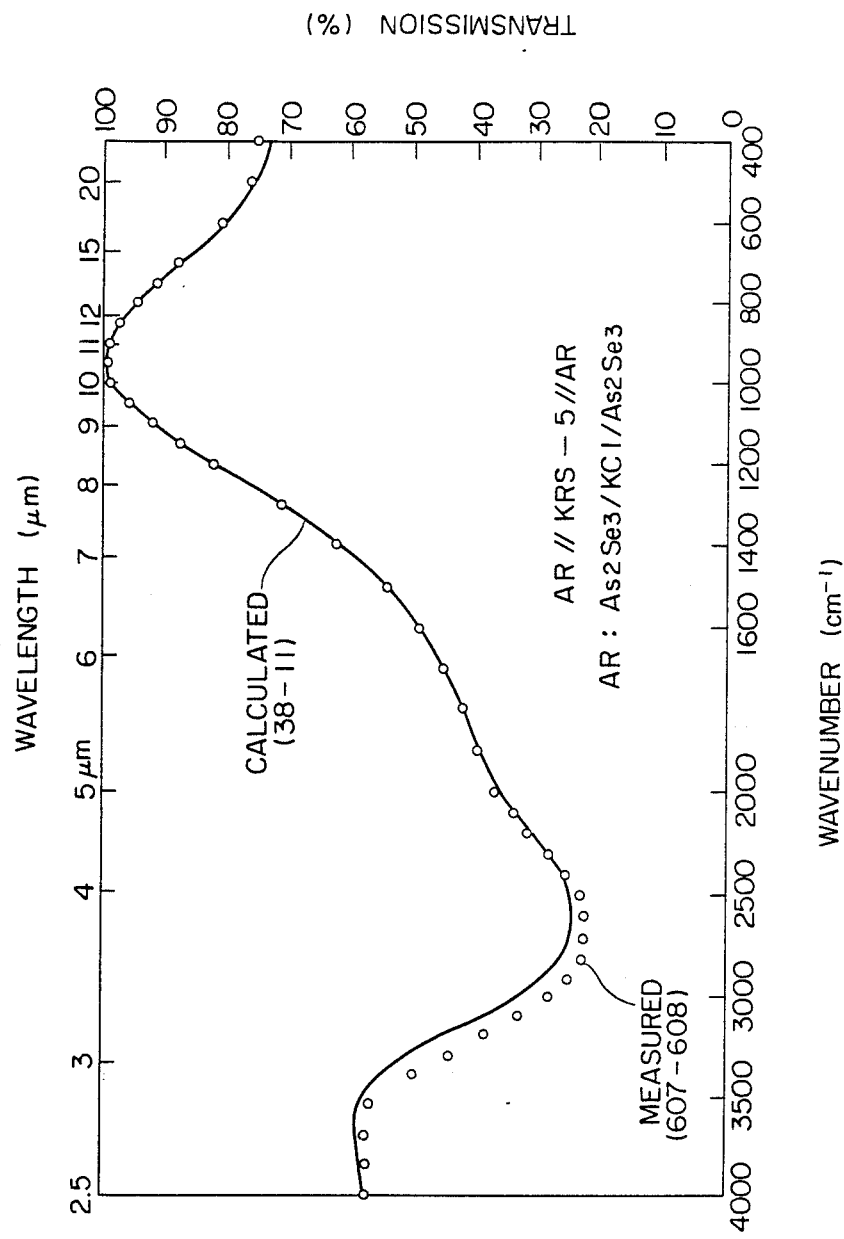
FIG. 2 is a diagram showing the spectrum of transmittances of an optical component made of KRS-5 in which the antireflection film according to the invention is incorporated.

FIG. 2 shows a spectrum of transmittances of samples of the disc of KRS-5 having the antireflection film deposited to both surfaces thereof. It will be seen that the measured values match the calculated values in the wavelength region between 4 and 20 μm.

In these samples, the absorptance was measured by a calorimetric method using a carbon dioxide laser beam of a wavelength of 10.6 μm, which was 0.022%. The measured value of the absorptance of the substrate of KRS-5 was 0.018%. The difference between the two values shows that the antireflection film at opposite side faces of the substrate have an absorptance of about 0.004%. Thus, the antireflection film produced as described hereinabove has proved to be very low in the absorptance.

Then, the antireflection film was tested for its laser-resistance property against irradiation of a laser beam. It is impossible to directly decide conditions for performing tests on the damage threshold level of samples with respect to laser beam irradiation because the results of tests would be greatly affected by the size of samples in relation to the diameter of a laser beam, the method of cooling samples, the ambient atmosphere for samples and the period of time for irradiating a laser beam. Therefore, the following experimental conditions were selected beforehand:

1. Irradiation tests were conducted in air.
2. The samples were allowed to cool in air.
3. The samples were each in the form of a window having the antireflection film according to the invention deposited to both side surface of a disc of KRS-5 having a diameter of 25 mm and a thickness of 3 mm.
4. The conditions for irradiating the laser beam were such that a 35 W laser beam was converged by a focusing lens of ZnSe to have a diameter of 0.35 mm ($\phi$ 99%) at the surface of the window, so that the power density was 36 KW/cm$^2$.
5. A laser beam was continuously irradiated on samples under the aforesaid conditions, and time-measurement was made until the film deteriorated. The measured time was used to determine operating life of the samples under laser beam irradiation.

The tests conducted under the aforesaid conditions show that samples of the antireflection film according to the invention have an operating life of about 40 hours which is longer than the operating life of about 30 hours of a conventional antireflection film having three layers of $As_2Se_3$, $PbF_2$ and $As_2Se_3$.

Tests were then conducted on the samples of the antireflection film according to the invention attached to both end face of a fiber having a diameter of 0.5 mm and a length of 115 mm to determine their operating life. The conditions for laser beam irradiations were as follows:

1. Irradiations of laser beam were conducted in a dry nitrogen ($N_2$) atmosphere.
2. The samples were naturally cooled in a dry $N_2$ atmosphere.
3. The conditions for irradiating a laser beam are such that a 35 W laser beam was converged by a focusing lens of ZnSe to have a diameter of 0.35 mm ($\phi$ 99%) on the surface of the window, so that the power density was 36 KW/cm$^2$.

Figure 3:
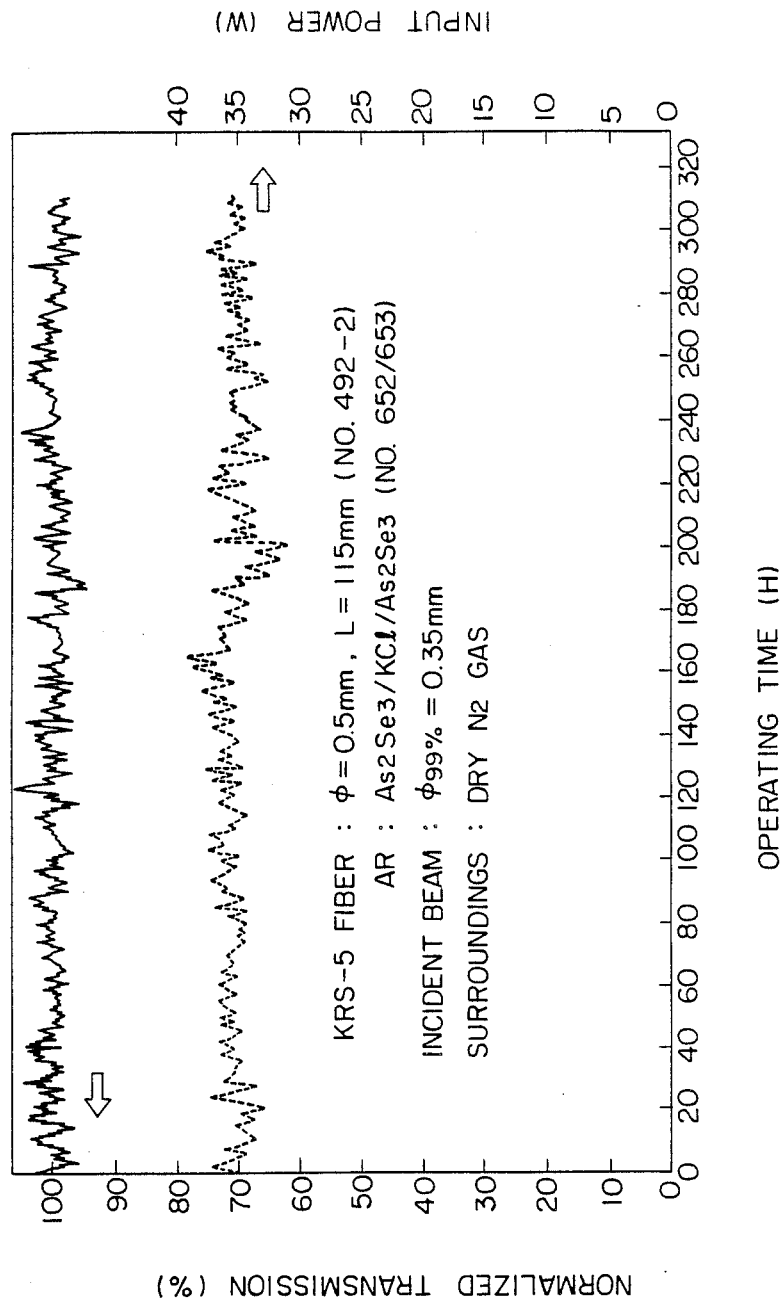
FIG. 3 is a diagram showing the results of experiments conducted on the operating life of a fiber formed of KRS-5 against laser beam irradiation, in which the antireflection film according to the invention is incorporated.

FIG. 3 shows the results of the aforesaid tests. The figure also shows normalized transmittance and laser input power as a function of operating time. In the figure, it will be seen that samples of the antireflection film used in the tests show no deterioration even after a continuous irradiation of the laser beam for 312 hours. Thus the antireflection film according to the invention is suitable for practical use.

Figure 4:
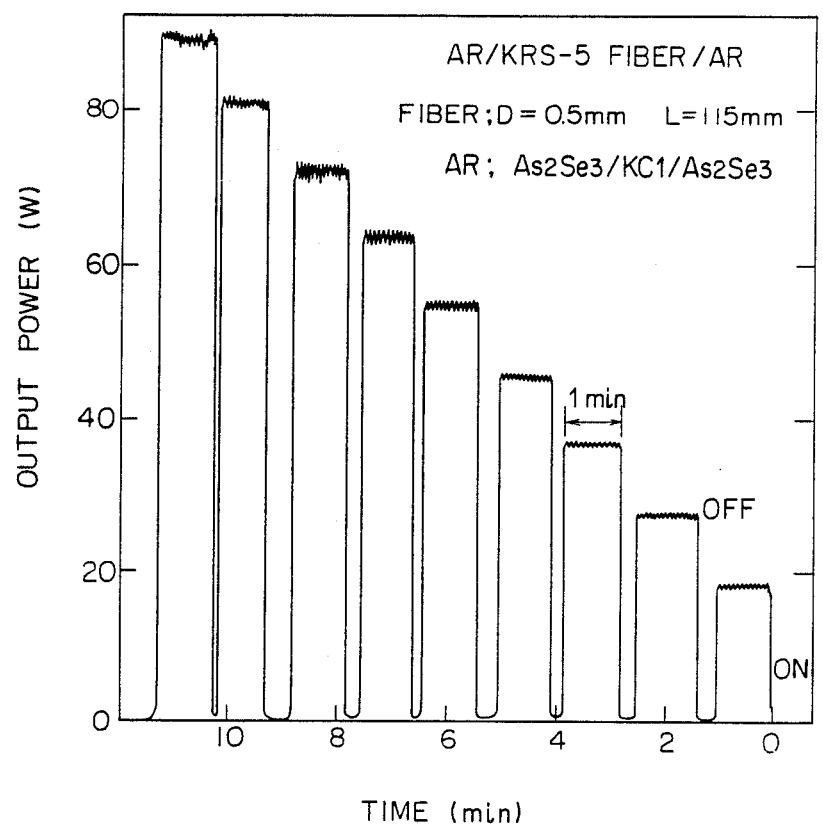
FIG. 4 is a diagram showing the results of experiments concerning laser-resistant property, against laser irradiation, of a fiber formed of KRS-5 in which the antireflection film according to the invention is incorporated.

Tests were conducted with the samples similar to those mentioned above, by successively increasing the input power of the laser beam. The results of the tests are shown in FIG. 4. Microscopic observations of the surface of the antireflection film showed no change even after a laser beam of a power of 95 W was irradiated for one minute. The tests were conducted in a dry $N_2$ atmosphere by using a laser beam of a diameter of 0.26 mm ($\phi$ 99%) having a power density of about 180 KW/cm$^2$ on the surface of the antireflection film. Tests were conducted on samples having an antireflection film of the prior art composed of three layers of $As_2Se_3$, $PbF_2$ and $As_2Se_3$ under the same conditions as described hereinabove. The results of the tests show that the maximum input power is 85 W. This would indicate that the antireflection film according to the invention comprised of three layers of $As_2Se_3$, KCl and $As_2Se_3$ is superior to the prior art antireflection film.

Another feature of the invention enabling the operating life of the antireflection film to be prolonged by using same in an protective gas atmosphere such as dry air or dry $N_2$ gas, will now be described.

FIG. 5 shows one embodiment of antireflection films, according to the invention. The antireflection film 6 is formed on both end face of a fiber 5 formed of KRS-5 and comprises, as clearly shown in FIG. 6, an arsenic triselenide ($As_2Se_3$) layer 7 formed on one end face of the fiber 5, a lead fluoride ($PbF_2$) or potassium chloride KCl layer 8 on the outside of the $As_2Se_3$ layer 7, and a $As_2Se_3$ layer 9 on the outside of the $PbF_2$ or KCl layer 8. The fiber 5 provided with the antireflection film 6 of the aforesaid construction at both ends is packed in an outer protective cable 10 having a window 11 and a focusing lens 12 located at an input end and an output end thereof, respectively. The fiber 5 provided with the antireflection film 6 a both ends is isolated from the atmosphere, and a space 13 defined in the cable 10 is filled with an protective gas, such as dry air on dry $N_2$ gas, which provides an surrounding atmosphere suitable for the operation of the antireflection film 6. A carbon dioxide laser 14 is used as a light source, and a focusing lens 15 is located between the carbon dioxide laser 14 and the window 11 at the inlet end of the cable 10.

The carbon dioxide laser 14 emits a laser beam 16 which is converged by the focusing lens 15 and introduced via the window 11 and antireflection film 6 to one end face of the fiber 5. The laser beam 16 thus incident on the fiber 5 emerges from the antireflection film 6 at the opposite end face of the fiber 5 and is led to an object to be irradiated via the focussing lens 12.

Figure 7:
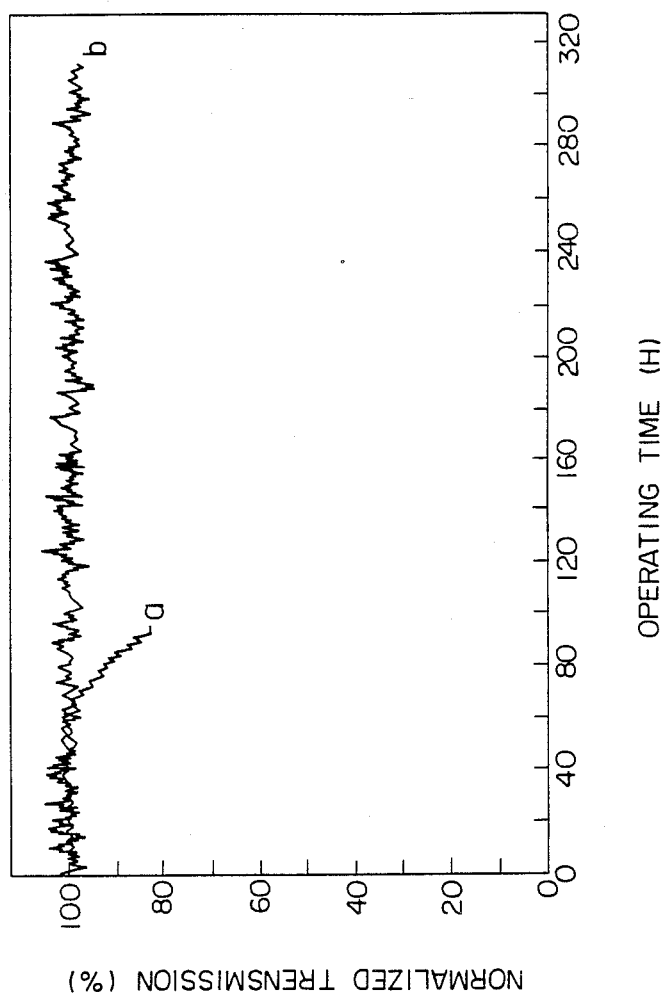
FIG. 7 is a diagram showing the results of experiments conducted on the operating life of a fiber formed of KRS-5 against laser beam irradiation by illustrating comparison between one example of the atmosphere according to the invention under which the fiber operates and an atmosphere of the prior art.

A concrete example of the experiments conducted on the assembly of the fiber encased in the outer cable and the carbon dioxide laser will be described. The fiber 5 formed of KRS-5 had a diameter of 0.5 mm and a length of 115 mm. The antireflection film 6 formed on both end face of the fiber 5 was of three-layer structure composed of a $As_2Se_3$ layer, a KCl layer and a $As_2Se_3$ layer. The focused laser beam used for irradiation had an input power of 38 W, a diameter of 0.35 mm ($\phi$ 99%) and a power density of 39 KW/cm$^2$. Under these conditions, tests were conducted by filling the space in the cable with dry $N_2$ gas to provide a favorable atmosphere for the antireflection film according to the invention. As a control, experiments were conducted by filling the space in the cable with natural air. The results of the tests are shown in FIG. 7 in which a line a represents the operating life of the antireflection film used in the natural air atmosphere of the prior art and a line b the operating life of the antireflection film used in the atmosphere of dry $N_2$ gas according to the invention. The lines a and b indicate 30 hours and 300 hours, respectively, of operating life. It will be apparent that the antireflection film as used in the atmosphere of dry $N_2$ gas can have a much longer operating life than the prior art and can be used for practical purposes.

While the invention has been described by using dry $N_2$ gas (gas filled in a cylinder) to provide a favorable $N_2$ atmosphere, it is to be understood that the invention is not limited to this specific gas and that any dry inert gas, such as helium, argon, xenon, etc., and a mixture thereof may be used to achieve the same results.

Figure 8:
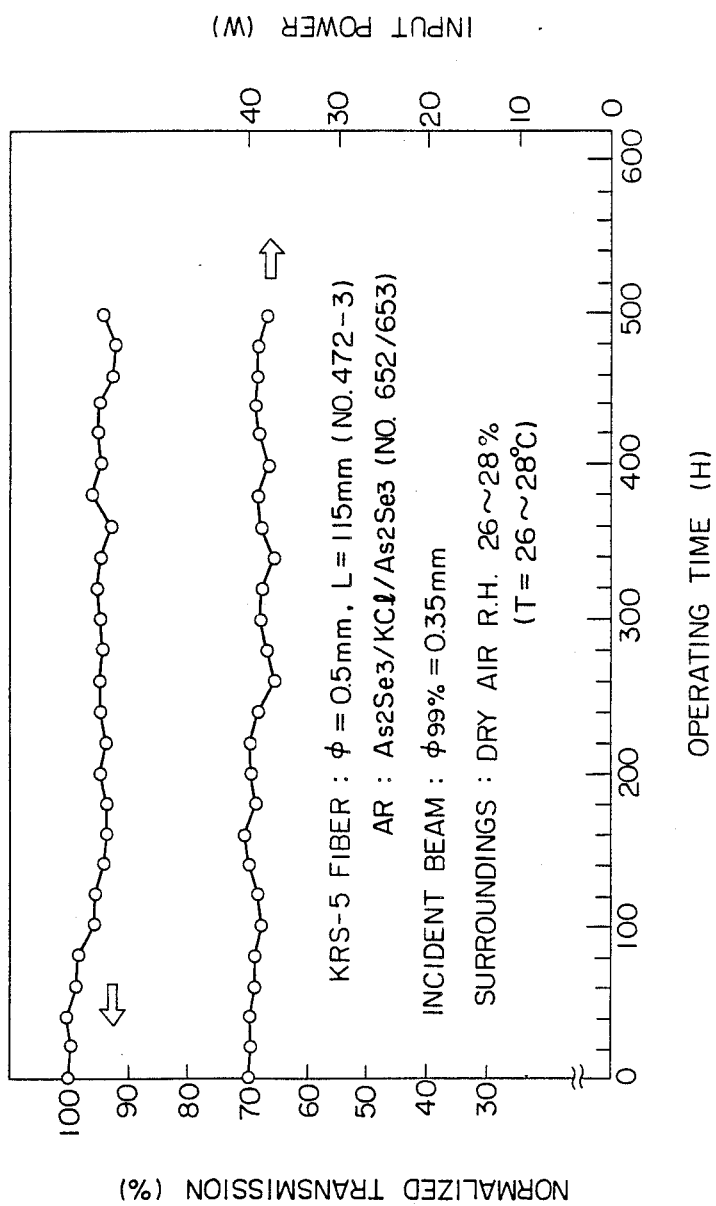
FIG. 8 is a diagram showing the results of experiments conducted on the operating life of a fiber formed of KRS-5, against laser beam irradiations in the dry air atmosphere according to the invention.

FIG. 8 shows the results of experiments conducted in a dry air atmosphere of a relative humidity in the range between 26 and 28% (temperature, 26°–28° C.). It will be seen that the antireflection film according to the invention has its operating life prolonged to enable it to be suitable for use for practical purposes when the relative humidity is below 30%.

Figure 9:
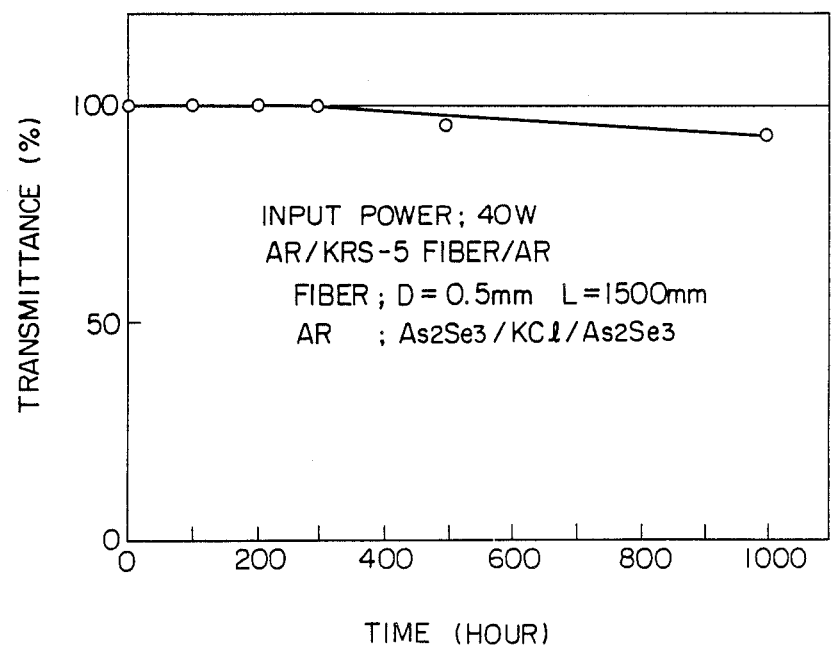
FIG. 9 is a diagram showing the results of experiments conducted on the operating life of a fiber formed of KRS-5 against laser beam irradiation and having a length of 1500 mm suitable for use for practical purposes.

A fiber formed of KRS-5 and having a diameter of 0.5 mm and a length of 1500 mm was provided with the antireflection film composed of the three layers, $As_2Se_3$, KCl and $As_2Se_3$ according to the invention formed on both end faces thereof. The fiber, which was intended for practical use, was inserted in a tube of stainless steel and assembled with an optical cable basically similar to the cable shown in FIG. 5. Experiments were conducted on transmission efficiency to determine its aging by subjecting the fiber to a continuous irradiation with a laser beam having an input power of 40 W in a dry $N_2$ gas atmosphere. With the laser beam of an input power of 40 W being irradiated on the antireflection film at one end face of the fiber, the laser beam had a diameter of 0.35 mm ($\phi$ 99%) on the antireflection film at the opposite end face of the fiber. Thus, the power density was about 40 KW/cm$^2$. As shown in FIG. 9, the aging occurring in transmission efficiency was gentle and the transmission efficiency is lowered by about 7% after lapse of 1000 hours. Since the fiber itself would be responsible for this reduction to a certain extent, a reduction in transmission efficiency caused by the antireflection film is considered to be lower than 7%. This would show that the antireflection film according to the invention can have practical application.

The three-layer antireflection film composed of the three layers of $As_2Se_3$, KCl and $As_2Se_3$ according to the invention deposited on a plate or fiber formed of KRS-5 has a very low absorptance which is below 0.01% when subjected to irradiation of a carbon dioxide laser beam of a wavelength of 10.6 $\mu$m, and consequently it generates a very small amount of heat. Experiments show that it can withstand a laser beam of an input power of 95 W and a power density of 180 KW/cm$^2$ and it has an operating life of over 1000 hours when subjected to a continuous irradiation of a laser beam of an input power of 40 W in an atmosphere of protective gas, such as dry air or dry $N_2$ gas.

Since antireflection film according to the invention has a prolonged operating life as described hereinabove, the film makes it possible to eliminate a loss of input power of about 28% which is caused by a reflection loss when a substrate or fiber is not provided with an antireflection film and allows all the input power to be effectively used. In other words, the same transmission output power can be obtained with a laser beam which is smaller in input power by 28%. This results in a reduction in the total operating cost of the system as a whole because it reduces loads applied to the power source and peripheral devices.

What is claimed is:

1. An antireflection film comprising a layer of arsenic triselenide having an optical thickness in the range between 2.518 and 2.783 $\mu$m, a layer of potassium chloride having an optical thickness in the range between 1.151 and 1.272 $\mu$m and a layer of arsenic triselenide having an optical thickness in the range between 0.577 and 0.749 $\mu$m which are successively formed, on an infrared radiation transmitting material member formed of a mixture of thalium iodide and thalium bromide.

* * * * *